US006224986B1

(12) United States Patent
Minowa et al.

(10) Patent No.: US 6,224,986 B1
(45) Date of Patent: May 1, 2001

(54) RARE EARTH PERMANENT MAGNET OF HIGH CORROSION RESISTANCE

(75) Inventors: Takehisa Minowa; Masao Yoshikawa; Ryuji Hamada, all of Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/358,822

(22) Filed: Jul. 22, 1999

(30) Foreign Application Priority Data

Jul. 22, 1998 (JP) ........................................ 10-206364

(51) Int. Cl.$^{7}$ ........................ B32B 9/00; B32B 15/04

(52) U.S. Cl. .................... 428/469; 428/450; 428/469; 428/701; 428/702; 427/331; 427/353; 427/374.1; 427/376.2; 427/397.8

(58) Field of Search ............................ 428/400, 469, 428/701, 702; 427/331, 353, 374.1, 376.2, 397.8

(56) References Cited

U.S. PATENT DOCUMENTS 5,840,375 * 11/1998 Katsumi et al. .................. 427/600

OTHER PUBLICATIONS

*Patent Abstracts of Japan*, 1997(5), abstract of JP 9–007868 (May 1997).

* cited by examiner

*Primary Examiner*—Deborah Jones
*Assistant Examiner*—Lymarie Miranda
(74) *Attorney, Agent, or Firm*—Wenderoth, Lind & Ponack, L.L.P.

(57) ABSTRACT

A neodymium/iron/boron permanent magnet is provided with high corrosion resistance by forming a coating layer of a vitrified sodium silicate on the surface. The vitreous coating layer of sodium silicate is formed by coating the surface of the permanent magnet with an aqueous coating solution of water glass followed by drying of the coating layer and vitrification of the dried coating layer by a heat treatment under specified conditions. Characteristically, the thus formed vitreous coating layer of sodium silicate is subjected to a leaching treatment with water at a specified temperature for a specified length of time in order to remove away residual sodium content leachable in water so that the troubles due to absorption of moisture by the alkali constituent in the sodium silicate coating layer can be largely dissolved.

11 Claims, No Drawings

RARE EARTH PERMANENT MAGNET OF HIGH CORROSION RESISTANCE

BACKGROUND OF THE INVENTION

The present invention relates to a method for the preparation of a rare earth-based permanent magnet having high corrosion resistance as well as to a rare earth-based permanent magnet having high corrosion resistance obtained by the method. More particularly, the invention relates to a method for imparting high corrosion resistance to a rare earth/iron/boron permanent magnet as well as to a rare earth/iron/boron permanent magnet having high corrosion resistance obtained by the method.

As is well known, rare earth-based permanent magnets in general have great advantages as compared with other types of non-rare earth permanent magnets in respects of their excellent magnetic properties and economical merits by virtue of remarkable compactness of the permanent magnets so that they are widely employed in the fields of electric and electronic instruments. Rare earth-based permanent magnets are now on a stage of further development where they are required to be of more and more improved magnetic performance in order to comply with the recent trend in the electric and electronic technologies.

Among several classes of rare earth-based permanent magnets heretofore developed, the so-called rare earth/iron/boron permanent magnets or, typically, neodymium/iron/boron permanent magnets are the most prominent as compared with the earlier developed samarium/cobalt permanent magnets in respects of the much superior magnetic properties and much lower material costs because neodymium is much more abundant as a rare earth resource than samarium and no or only a small amount of expensive cobalt is required in the formulation of the magnet alloy composition. Accordingly, neodymium/iron/boron permanent magnets are highlighted and expected in the near future to substitute not only for samarium/cobalt permanent magnets conventionally employed in a compact-size magnetic circuit but also for hard ferrite permanent magnets of a relatively large size and certain large electromagnets.

Rare earth/iron/boron permanent magnets in general, however, have a serious disadvantage that, as an inherence of the rare earth element or neodymium and iron as the principal metallic constituents of the magnet alloy composition, the magnet is readily oxidized on the surface within a short time when kept in an atmosphere of moisture-containing air. When oxidation takes place on the surface of a rare earth/iron/boron permanent magnet built in an electric or electronic instrument, a decrease is unavoidable in the performance of the magnetic circuit if not to mention the problem of contamination of ambience by the rust particles formed by oxidation and falling off the magnet surface.

With an object to improve corrosion resistance of a rare earth/iron/boron permanent magnet, proposals are made heretofore for methods to provide the magnet surface with a protective coating layer such as a resinous coating layer and a metallic coating layer of, for example, nickel which is formed by a dry-process vapor-phase deposition method, e.g., ion plating, or by a wet-process electrolytic plating method. These surface coating methods are practically not feasible due to the high costs requited for the process which is necessarily very complicated.

In view of the problem of high costs in the above mentioned surface coating methods, a simpler and less expensive surface treatment method is proposed in Japanese Patent Kokai 6-302420, according to which the surface treatment of a rare earth/iron/boron permanent magnet is finished by a chromic acid treatment alone. This method, however, cannot be very inexpensive by all means because the chromic acid treatment must be preceded by a pickling treatment with an acid such as nitric acid and the spent chromic acid solution, which is notoriously toxic to cause heavy environmental pollution, must be disposed with complete safety necessarily requiring a high cost.

As an alternative of the above mentioned chromic acid treatment having problems relative to the high costs and difficulty in the waste disposal, a method is proposed in Japanese Patent Kokai 9-7867 and 9-7868, according to which a vitreous protective coating layer is formed on the surface of a rare earth/iron/boron permanent magnet by coating with an aqueous solution of an alkali silicate followed by a heat treatment for vitrification of the coating layer. This method in fact is a useful method at least when the surface-coated permanent magnet is employed in an atmosphere of air of which the humidity is not excessively high since the treatment method is relatively simple but still gives a considerably good rustproofing effect.

When a rare earth/iron/boron permanent magnet provided with a vitreous protective coating layer of alkali silicate is employed in an atmosphere of a relatively high humidity, on the other hand, the alkali constituent contained in the vitreous coating layer is responsible for absorption of moisture from the atmosphere. Once the coating layer is moistened by absorbing moisture, the desired effect of corrosion resistance can no longer be fully exhibited by the vitreous coating layer.

Moreover, the alkali constituent contained in the vitreous protective coating layer of alkali silicate is readily leached out into an aqueous or oily medium surrounding the magnet to cause heavy contamination around the magnet body. This problem, of course, can be at least partly solved by using an alkali silicate of which the content of the alkali constituent relative to the silica constituent is remarkably decreased. The amount of the alkali constituent relative to silica in the alkali silicate, however, cannot be low enough to be sufficient to avoid the trouble due to absorption of moisture by and leaching out of the alkali mentioned above because the alkali constituent in the alkali silicate acts to promote vitrification of the alkali silicate forming a coating layer in the heat treatment and to reduce shrinkage of the coating layer by vitrification so as to ensure good corrosion resistance of the vitreous protective coating layer.

SUMMARY OF THE INVENTION

The present invention accordingly has an object to provide a novel method for the preparation of a rare earth/iron/boron permanent magnet body of high corrosion resistance by means of providing a vitrified protective coating layer of an alkali silicate which is free from the problems of a decrease in the corrosion resistance of the magnet and contamination of ambience due to the alkali constituent in the protective coating layer of vitrified alkali silicate.

Thus, the method of the present invention for the preparation of a highly corrosion-resistant rare earth/iron/boron permanent magnet comprises the steps of:

(a) coating the surface of a rare earth/iron/boron permanent magnet with an aqueous coating solution of an alkali silicate to form a coating layer;

(b) drying the coating layer to give a dried coating layer of the alkali silicate or, preferably, sodium silicate;

(c) subjecting the dried coating layer of the alkali silicate to a heat treatment at a temperature in the range from 50 to 450° C. for at least 1 minute to form a vitreous coating layer of the alkali silicate; and (d) bringing the vitreous coating layer of the alkali silicate into contact with water at a temperature in the range from 10 to 90° C. for a length of time in the range from 1 to 60 minutes to remove away water-leachable alkaline constituent in the vitreous coating layer of the alkali silicate, the coating amount of the coating solution in step (a) being such that the vitreous coating layer of the alkali silicate formed in step (c) has a thickness in the range from 0.1 to 10 $\mu$m.

The highly corrosion-resistant rare earth/iron/boron permanent magnet provided by the present invention is an integral body which comprises:

(A) a base body of a rare earth/iron/boron permanent magnet; and (B) a coating layer of a vitreous alkali silicate having a thickness in the range from 0.1 to 10 $\mu$m formed on the surface of the base body, the coating layer of the vitreous sodium silicate containing sodium constituent leachable in water at 80° C. in an amount not exceeding 10 $\mu$g per $cm^2$ of the surface of the coating layer.

DETAILED DESCRIPTION OF THE PREFERRED EMBODIMENTS

Although the above given description is given solely for a rare earth/iron/boron permanent magnet as the objective body to which the method of the present invention is applicable, it may be too much to say that the inventive method is applicable to any types of rare earth-based permanent magnets which are desired to be imparted with high corrosion resistance.

The rare earth element as the principal constituent metal of the rare earth/iron/boron permanent magnet can be any one or any combination of the rare earth elements including ytttrium and the elements having an atomic number of 57 to 71, of which cerium, lanthanum, neodymium, praseodymium, dysprosium and terbium are important and neodymium is more important.

The rare earth/iron/boron permanent magnet usually contains from 5 to 40% by weight of one or a combination of the rare earth elements, from 50 to 90% by weight of iron and from 0.2 to 8% by weight of boron. A part of the iron content can be replaced with cobalt if an improvement in the temperature characteristics of the magnet is desired. The amount of cobalt, when added, is in the range from 0.1 to 15% by weight. When the adding amount of cobalt is too small, the desired improvement in the temperature characteristics of the magnet cannot be obtained as a matter of course. A too large amount of cobalt to replace iron is detrimental against the coercive force of the permanent magnet.

It is further optional that the alloy composition of the rare earth/iron/boron permanent magnet is admixed with other additive elements such as nickel, niobium, aluminum, titanium. zirconium, chromium, vanadium, manganese, molybdenum, silicon, tin, copper, calcium, magnesium, lead, antimony, gallium and zinc with an object to accomplish an Improvement of a certain particular magnetic property of the magnet or to decrease the material cost.

The method for the preparation of a rare earth/iron/boron permanent magnet, which is basically a powder metallurgical process, is well known in the art of magnetic materials and not described here in any detail.

In step (a) of the inventive method, a rare earth/iron/boron permanent magnet, referred to simply as a magnet hereinafter, is coated with an aqueous coating solution prepared by dissolving an alkali silicate in water to form a coating layer. Though not limitative, the alkali silicate is selected from sodium silicate, potassium silicate and lithium silicate, of which sodium silicate is preferable due to economical reasons because sodium silicate is available in the form of a so-called water glass at low costs.

Taking sodium silicate as a typical example of alkali silicates, the molar ratio of $SiO_2$ to $Na_2O$ is an important parameter to affect the behavior of sodium silicate for vitrification by a heat treatment and to determine properties of the vitrified protective coating layer. In this regard, the molar ratio of silica $SiO_2$ to alkali oxide, e.g., $Na_2O$, should be in the range from 1.5 to 20.0 or, preferably, from 3.0 to 9.0. When this molar ratio is too small, the vitrified protective coating layer of the alkali silicate contains an unduly large amount of alkali ions so that removal of leachable alkaline constituent in the subsequent step (d) can hardly be complete under the specified conditions. When the silica/alkali molar ratio is too large, on the other hand, shrinkage of the alkali silicate coating layer in the heat rreatment in step (c) proceeds excessively by the dehydration condensation of the silanolic hydroxyl groups contained in an excessively large amount resulting in eventual formation of cracks in the vitrified coating layer which cannot exhibit full protective effects. When a water glass having the silica/sodium oxide molar ratio too low or too high is to be used, the silica/sodium oxide ratio can be adjusted by admixing the aqueous solution of the water glass with ultrafine silica particles or colloidal silica particles or with sodium hydroxide, respectively.

In step (a) of the inventive method, a rare esarth/iron/boron permanent magnet is coated with an aqueous solution of the alkali silicate to form a coating layer on the magnet surface. The concentration of the aqueous alkali silicate solution should be adjusted such that a desired thickness of the vitreous protective coating layer can be obtained by a single coating work. The method of coating is not particularly limitative and can be any of conventional methods including dip coating, brush coating, spray coating and the like. The thus formed coating lyaer of the alkali silicate solution is then subjected in step (b) to a drying treatment either at room temperature or at an elevated temperature to form a dried coating layer of the alkali silicate as a pretreatment of the heat treatment in step (c).

The heat treatment in step (c) of the inventive method is undertaken to vitrify the dried coating layer of an alkali silicate into a vitreous protective coating layer by the mechanism of dehydration condensation reaction between silanolid hydroxyl groups. In order to accomplish full vitrification of the coating layer, the heat treatment is undertaken at a temperature in the range from 50 to 450° C., or, preferably, from 120 to 450° C. When the temperature of the heat treatment is too low, the reaction rate of the silanolic dehydration condensation is too low so that vitrification of the alkali silicate would be incomplete unless the treatment time is unduly extended to adversely affect productivity of the process. When the temperature of the heat treatment is too high, on the other hand, the reaction rate of the silanolic dehydration condensation is too high resulting in eventual crack formation in the coating layer along with a possibility of degradation in the magnetic properties of the rare earth/iron/boron permanent magnet per se.

The length of time for the heat treatment in step (c) of the inventive method is in the range from 1 to 120 minutes.

When the heat treatment time is too short, complete vitrification of the alkali silicate coating layer can hardly be accomplished as a matter of course while extension of the time to exceed the above mentioned upper limit has no particular additional advantages on the properties of the vitrified coating layer rather with an economical disadvantage due to a decrease in the productivity of the process.

The vitreous protective coating layer of the alkali silicate formed in the above described steps should have a film thickness in the range from 0.1 to 10 μm or, preferably, from 0.5 to 10 μm. If the film thickness of the layer obtained by a single sequence of steps (a) to (c) is too small, the sequence of steps (a) to (c) can be repeated twice or more until a desired film thickness of the coating layer can be obtained. When the film thickness of the coating layer to be subjected to the treatment in step (d) is too small, the surface of the permanent magnet per se is subject to a direct attack of the water in the subsequent step (d), which is a water-leaching treatment to remove away any water-leachable alkaline constituent in the alkali silicate coating layer, not to give a full corrosion-resistant effect. Although no particularly adverse effect is caused by a protective coating layer having a too large thickness, on the other hand, it is sometimes a difficult matter to ensure good uniformity of a coating layer having a large thickness if not to mention a practical disadvantage due to a decrease in the effective magnet volume relative to the gross volume of the so heavily coated permanent magnet in assemblage of the permanent magnet in an instrument.

The most characteristic feature of the inventive method consists in step (d) which is a dealkalinizing water-leaching treatment of the rare earth/iron/boron permanent magnet provided with a vitreous protective coating layer of an alkali silicate on the surface as obtained in step (c) to remove away any water-leachable alkaline constituent. The treatment is conducted by bringing the surface-coated permanent magnet into contact with water at a temperature in the range from 10 to 90° C. or, preferably, from 50 to 80° C. for a length of time in the range from 1 to 60 minutes. When the leaching temperature is too low, full removal of the water-leachable alkaline constituent can hardly be accomplished unless the leaching time is unduly extended resulting in an economical disadvantage due to a decrease in the productivity of the process. When the leaching temperature is too high, a damage may eventually be caused in the vitreous protective coating layer resulting in a decrease in the corrosion resistance of the protective coating layer even though removal of the water-leachable alkaline constituent can be so complete. When the treatment time is too short, removal of the water-leachable alkaline constituent from the vitreous coating layer of alkali silicate is incomplete as a matter of course while, when the treatment time is too long, a trouble is caused which is similar to that caused by an excessively high treatment temperature mentioned above.

Assuming that the treatments in steps (a) to (d) have been undertaken all adequately, the vitreous protective coating layer of alkali silicate, e.g., sodium silicate, can be tested for the residual content of leachable sodium, which is determined by keeping the coated magnet in a bath of ultrapure water at 80° C. for 2 hours followed by measurement of the amount of sodium in water by the ion chromatographic method, not to exceed 10 μg sodium per $cm^2$ surface area of the vitreous protective coating layer of sodium silicate.

In the following, the method of the present invention is illustrated in more detail by way of Examples and Comparative Examples, which, however, never limit the scope of the invention in any way.

EXAMPLE 1

An alloy ingot of a rare earth/iron/boron permanent magnet was prepared by high frequency induction melting under an atmosphere of argon from 32% by weight of neodymium, 1.2% by weight of boron, 59.8% by weight of iron and 7% by weight of cobalt each in a metallic or elementary form. The alloy ingot was crushed in a jaw crusher into coarse granules which were finely pulverized in a jet mill with nitrogen as the jet gas into fine particles having an average particle diameter of 3.5 μm. The thus obtained magnet alloy powder was introduced into a metal mold and compression-molded under a pressure of 1000 $kg/cm^2$ in a magnetic field of 10 kOe to give a powder compact.

The thus molded powder compact as a green body was subjected to a sintering heat treatment in vacuum at 1100° C. for 2 hours followed by an aging treatment at 550° C. for 1 hour to give a sintered permanent magnet block from which a disk-formed permanent magnet sample having a diameter of 21 mm and a thickness of 5 mm was prepared by mechanical working. The surface of the magnet sample was finished by barrel polishing followed by ultrasonic cleaning in water and drying.

Separately, an aqueous coating solution of sodium silicate was prepared by dissolving a commercial product of #3 water glass according to the JIS standard, of which the molar ratio of $SiO_2/Na_2O$ was 3.2, in deionized water in such an amount that the concentration calculated for $SiO_2$ was 40 g/liter.

The above prepared permanent magnet sample was dipped in and then pulled up from the aqueous sodium silicate solution to form a coating layer of the solution on the surface. The permanent magnet sample thus provided with the coating layer was subjected to a heat treatment in a hot-air circulation oven at 150° C. for 20 minutes to effect drying and vitrification of the sodium silicate layer into a vitreous coating layer of sodium silicate.

The permanent magnet sample having the thus vitrified sodium silicate coating layer was dipped in a bath of deionized water at 70° C. for 2 minutes to effect dealkalinization of the sodium silicate layer followed by drying. This dealkalinized sodium silicate layer had a thickness of 0.7 μm as determined by the XPS (X-ray photoelectron spectrometric) method.

The thus prepared permanent magnet sample having a dealkalinized vitreous sodium silicate coating layer was subjected to the test of the residual content of alkaline constituent leachable in water by keeping the sample in a bath of ultrapure water at 80° C. for 2 hours to obtain a value of 4.0 μg sodium per $cm^2$ surface area of the coating layer.

Further, the permanent magnet sample after the dealkalinization treatment was subjected to an accelerated degradation test of the coating layer by keeping the same in an atmosphere of 90% relative humidity at 80° C. for 200 hours and the appearance of the magnet sample was visually inspected to detect absolutely no noticeable changes in the appearance.

EXAMPLES 2, 3 AND 4

The experimental conditions in each of these Examples 2, 3 and 4 were substantially the same as in Example 1 excepting for the extension of the time for the dealkalinizing leaching treatment of the vitreous sodium silicate coating layer from 2 minutes to 10 minutes, 30 minutes and 60 minutes, respectively. The results of the test for the residual amount of water-leachable sodium contents in the coating layer were 1.5 μg/$cm^2$, 0.3 μg/$cm^2$ and 0.2 μg/$cm^2$, respectively. Absolutely no noticeable changes were detected in the appearance of the permanent magnet sample having a dealkalinized sodium silicate coating layer in each of these Examples in the accelerated degradation test undertaken in the same manner as in Example 1.

COMPARATIVE EXAMPLES 1, 2 AND 3

The experimental conditions in each of these Comparative Examples 1, 2 and 3 were substantially the same as in Example 1 excepting for omission of the dealkalinizing leaching treatment, a decrease of the time of the dealkalinizing leaching treatment from 2 minutes to 30 seconds and an increase of the time of the dealkalinizing leaching treatment from 2 minutes to 90 minutes, respectively. The results of the test for the residual amount of water-leachable sodium content were 18.0 μg/$cm^2$, 13.0 μg/$cm^2$ and 0.1 μg/$cm^2$, respectively. Absolutely no noticeable changes were detected in the appearance of the permanent magnet samples having a dealkalinized sodium silicate coating layer in each of Comparative Examples 1 and 2 after the accelerated degradation test while rust spots were detected on the surface of the magnet in Comparative Example 3.

COMPARATIVE EXAMPLE 4

The experimental conditions in this Comparative Example were substantially the same as in Example 3 except that the vitreous sodium silicate coating layer after the dealkalinizing leaching treatment had a thickness of 0.05 μm instead of 0.7 μm as a consequence of the use of a more diluted coating solution. The result of the test for the amount of residual water-leachable alkaline content was 0.1 μg sodium per $cm^2$ surface area of the coating layer but rust spots were detected in the accelerated degradation test.

EXAMPLES 5, 6, 7 AND 8

The experimental conditions in each of these Examples 5, 6, 7 and 8 were substantially the same as in Example 1 except that the temperature of the water bath for the dealkalinizing leaching treatment was 20° C., 40° C., 60° C. and 80° C., respectively, instead of 70° C. The results of the test for the residual amount of water-leachable sodium content were 6.0 μg/$cm^2$, 2.0 μg/$cm^2$, 1.0 μg/$cm^2$ and 0.3 μg/$cm^2$, respectively. Absolutely no noticeable changes were detected in the appearance of the permanent magnet samples having a dealkalinized sodium silicate coating layer in each of these Examples in the accelerated degradation test.

COMPARATIVE EXAMPLES 5 AND 6

The experimental conditions in each of these Comparative Examples 5 and 6 were substantially the same as in Example 1 except that the temperature of the water bath for the dealkalinizing leaching treatment was 5° C. and 95° C., respectively, instead of 70° C. The results of the test for the residual amount of water-leachable sodium content were 13.0 μg/$cm^2$ and 0.1 μg/$cm^2$, respectively. Absolutely no noticeable changes were detected in the appearance of the permanent magnet sample in Comparative Example 5 having a dealkalinized sodium silicate coating layer after the accelerated degradation test but appearance of rust spots was found on the surface of the magnet in Comparative Example 6.

What is claimed is:

1. A highly corrosion resistant rare earth/iron/boron permanent magnet which consists of:

(A) a base body of a rare earth/iron/boron permanent magnet; and (B) a coating layer of a vitreous sodium silicate formed on the surface of the base body, the coating layer of the vitreous sodium silicate containing sodium constituent leachable by keeping the same in water at 80° C. for 2 hours in an amount not exceeding 10 μg per $cm^2$ of the surface area of the coating layer.

2. The highly corrosion resistant rare earth/iron/boron permanent magnet as claimed in claim 1 in which the coating layer of the vitreous sodium silicate has a thickness in the range from 0.1 to 10 μm.

3. The highly corrosion resistant rare earth/iron/boron permanent magnet as claimed in claim 2 which the coating layer of the vitreous sodium silicate has a thickness in the range from 0.5 to 10 μm.

4. A method for the preparation of a highly corrosion-resistant rare earth/iron/boron permanent magnet as claimed in claim 1 which comprises the steps of:

(a) coating the surface of a rare earth/iron/boron permanent magnet with an aqueous coating solution of an alkali silicate to form a coating layer;

(b) drying the coating layer to give a dried coating layer of the alkali silicate;

(c) subjecting the dried coating layer of the alkali silicate to a heat treatment at a temperature in the range from 50 to 450° C. for at least 1 minute to form a vitreous coating layer of the alkali silicate; and (d) bringing the vitreous coating layer of the alkali silicate into contact with water at a temperature in the range from 10 to 90° C. for a length of time in the range from 1 to 60 minutes to remove away water-leachable alkaline constituent in the vitreous coating layer of the alkali silicate, the coating amount of the coating solution in step (a) being such that the vitreous coating layer of the alkali silicate formed in step (c) has a thickness in the range from 0.1 to 10 μm.

5. The method for the preparation of a highly corrosion-resistant rare earth/iron/boron permanent magnet as claimed in claim 4 in which the alkali silicate is sodium silicate.

6. The method for the preparation of a highly corrosion-resistant rare earth/iron/boron permanent magnet as claimed in claim 5 in which the molar ratio of $SiO_2$:$Na_2O$ of the sodium silicate is in the range from 1.5 to 20.0.

7. The method for the preparation of a highly corrosion-resistant rare earth/iron/boron permanent magnet as claimed in claim 6 in which the molar ratio of $SiO_2$:$Na_2O$ of the sodium silicate is in the range from 3.0 to 9.0.

8. The method for the preparation of a highly corrosion-resistant rare earth/iron/boron permanent magnet as claimed in claim 4 in which the temperature of the heat treatment in step (c) is in the range from 120 to 450° C.

9. The method for the preparation of a highly corrosion-resistant rare earth/iron/boron permanent magnet as claimed in claim 4 in which the length of time for the heat treatment in step (c) is in the range from 1 to 120 minutes.

10. The method for the preparation of a highly corrosion-resistant rare earth/iron/boron permanent magnet as claimed in claim 4 in which the coating amount of the coating solution in step (a) is such that the vitreous coating layer of the alkali silicate formed in step (c) has a thickness in the range from 0.5 to 10 μm.

11. The method for the preparation of a highly corrosion-resistant rare earth/iron/boron permanent magnet as claimed in claim 4 in which the temperature of water in step (d) is in the range from 50 to 80° C.

* * * * *